D. STAPLETON.
Sheep Rack.

No. 68,320. Patented Aug. 27, 1867.

WITNESSES:
D. Onward
William Nuers

INVENTOR:
David Stapleton
Per Wiedersheim & Co
attorneys

United States Patent Office.

DAVID STAPLETON, OF IOWA CITY, IOWA.

Letters Patent No. 68,320, dated August 27, 1867.

IMPROVEMENT IN SHEEP-RACK.

*The Schedule referred to in these Letters Patent and making part of the same.*

TO ALL WHOM IT MAY CONCERN:

Be it known that I, DAVID STAPLETON, of Iowa City, in the county of Johnson, and State of Iowa, have invented a new and useful Improvement in Sheep-Racks; and I do hereby declare the following to be a full and correct description of the same, sufficient to enable others skilled in the art to which my invention appertains to fully understand and construct the same, reference being had to the accompanying drawings, making part of this specification, and in which—

Similar letters of reference indicate corresponding parts in the several figures.

Figure 1:
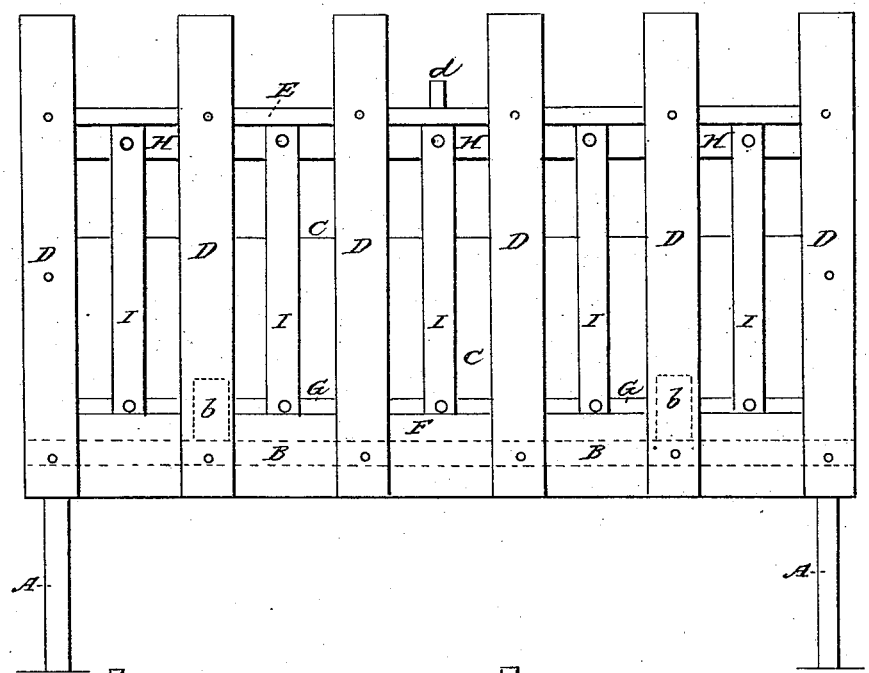
Figure 1 is a front view.

The nature of my invention consists in providing a sheep-rack of peculiar shape with a loose rack, in such a manner that this loose rack may serve to either close the sheep-rack, so as to prevent the sheep from putting their heads into the same, or as a protection against the waste of hay, and the falling of the hay-seeds and dirt into the wool of the sheep.

A A, in the drawings, represent the sides of the sheep-rack, which is provided with a bottom board, B, and a rear board, C. The side pieces A A are sloping downwards towards the rear, as shown at $a$. The vertical boards or pieces D are attached at the top and bottom to the cross-pieces E and F, at such distance from each other as to allow the head of the sheep to pass between them. Two cleats $b$ are attached to the inner side of the cross-piece F, in such a manner as to form, with any two of the vertical boards D, bearings for the rounded bottom cross-pieces G, of the loose rack, to which and the top cross-board H, of the loose rack, vertical piece I, is attached in such a manner that each piece I, when the loose rack is placed vertically in the bearings formed by the cleats $b$, shall be between, equidistant from two of the vertical boards D. $c\ c$ are pieces provided with vertical U-shaped slots, attached on the inside to the sides A, and forming bearings for the ends of the cross-piece G, of the loose rack. When the loose rack is in position to close the sheep-rack, it is held in place by a pin, $d$, passing through the cross-board E, and behind the cross-piece H.

It is well known that a great difficulty in raising sheep is to prevent them from spoiling their wool by dirtying it, especially when feeding on hay, the seeds and other chaff dropping on and settling in the wool around the neck and shoulders. Sheep, in feeding hay from above their heads, are fond of pulling the hay out from the crib or rack in large quantities, which not only allows great quantities of seeds and dirt to fall into their wool, but also causes a great deal of the hay to be trodden under their feet and wasted. By my invention these difficulties are entirely obviated.

Figure 2:
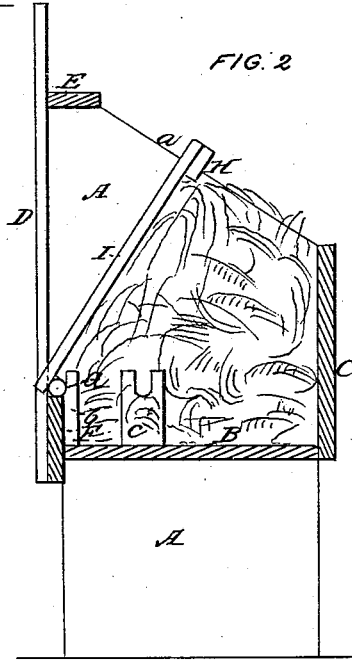
Figures 2 and 3 are sectional side views of my invention.
Figure 3:
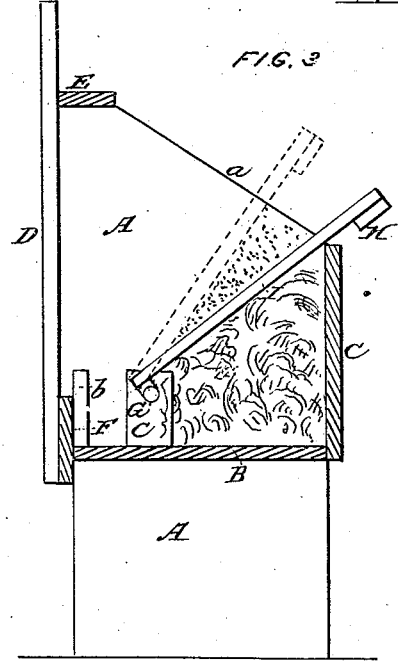

When the sheep are to be fed, the hay is placed in sufficient quantity into the body of the rack, the sheep standing in front of it. The pin $d$ is then withdrawn and the loose rack allowed to fall on to the tray, as shown in fig. 2, the weight of which keeps the hay compact and prevents the sheep from tearing out more at a time than they can eat, and as they have the hay beneath them, the seeds and dirt cannot fall and settle into their wool. When it is wished still more to prevent the waste of hay, the loose rack may be placed into the slots of the pieces $c$, as shown in fig. 3, when any waste hay must necessarily fall into the space between the loose rack and the front board F, which latter can, if desired, extend to the ground, and thus by placing a number of the sheep-racks contiguous to each other in a circle, a cheap and strong sheep-pen and rack combined may be formed. By using my improved sheep-rack any boy who can reach high enough can feed the sheep, as no strength is required to withdraw the pin $d$ and allow the loose rack to fall. The sheep may be fed and the hay distributed equally, from time to time, without the sheep interfering with the feeder.

Having thus described my invention, what I claim as new, and desire to secure by Letters Patent, is—

1. The loose rack G H I, and its bearings $b$ and $c$ in a sheep-rack, substantially as and for the purposes described.

2. The sheep-rack, constructed with the loose rack, the vertical pieces I of which fit between its vertical pieces or boards D, substantially in the manner and for the purposes described.

The above specification of my improvement in sheep-racks signed this eleventh day of June, 1867.

DAVID STAPLETON.

Witnesses:
ALEX. A. C. KLAUCKE,
D. OURAND.